United States Patent
Noh et al.

(10) Patent No.: US 12,235,412 B2
(45) Date of Patent: Feb. 25, 2025

(54) SMALL LENS SYSTEM FOR TOF

(71) Applicant: SEKONIX CO., LTD., Gyeonggi-do (KR)

(72) Inventors: Ki Youn Noh, Gyeonggi-do (KR); Soon Cheol Choi, Gyeonggi-do (KR); Sung Nyun Kim, Incheon (KR); Seong Jun Bae, Gyeonggi-do (KR)

(73) Assignee: SEKONIX CO., LTD., Gyeonggi-do (KR)

( * ) Notice: Subject to any disclaimer, the term of this patent is extended or adjusted under 35 U.S.C. 154(b) by 579 days.

(21) Appl. No.: 17/505,321

(22) Filed: Oct. 19, 2021

(65) Prior Publication Data

US 2022/0128795 A1  Apr. 28, 2022

(30) Foreign Application Priority Data

Oct. 22, 2020  (KR) .......... 10-2020-0137367

(51) Int. Cl.
  *G02B 13/18*  (2006.01)
  *G02B 9/34*  (2006.01)
  *G02B 13/00*  (2006.01)

(52) U.S. Cl.
  CPC ............. *G02B 13/004* (2013.01); *G02B 9/34* (2013.01)

(58) Field of Classification Search
  CPC ... G02B 9/00; G02B 9/34; G02B 9/36; G02B 9/38; G02B 9/44; G02B 9/50; G02B 9/56; G02B 9/58; G02B 13/00; G02B 13/001; G02B 13/0015; G02B 13/002; G02B 13/004; G02B 13/008; G02B 13/14; G02B 13/143; G02B 13/146; G02B 13/18
  USPC ............... 359/715, 745–747, 749, 753–754, 359/771–775
  See application file for complete search history.

(56) References Cited

U.S. PATENT DOCUMENTS

| | | | |
|---|---|---|---|
| 7,321,474 B1 * | 1/2008 | Jo | G02B 13/004 359/773 |
| 8,730,590 B1 * | 5/2014 | Tsai | G02B 13/004 359/722 |
| 9,097,860 B2 * | 8/2015 | Yu | G02B 13/04 |
| 10,302,916 B2 * | 5/2019 | Liu | G02B 13/004 |
| 10,901,179 B2 * | 1/2021 | Chen | G02B 9/34 |

* cited by examiner

*Primary Examiner* — Thong Q Nguyen
(74) *Attorney, Agent, or Firm* — Mendelsohn Dunleavy, P.C.

(57) ABSTRACT

Disclosed is a small lens system including a first lens, a second lens, a third lens, and a fourth lens sequentially arranged from an object along an optical axis, wherein the thickness (ct1) of the first lens, the thickness (ct3) of the second lens, the thickness (ct5) of the third lens, and the thickness (ct7) of the fourth lens satisfy ct1+ct3>ct5+ct7, ct1>ct3, ct1>ct5, and ct1>ct7, the front surface of the first lens is convex toward the object while the sagittal amount of the first lens is increased depending on the height thereof, the refractive power (P2) of the second lens satisfies $-0.01$ mm$^{-1}$<P2<0.01 mm$^{-1}$, the front curvature (C3) and the rear curvature (C4) of the second lens satisfy |C3|<0.1 mm$^{-1}$ and |C4|<0.1 mm$^{-1}$, and the f-number of the lens system is less than 1.4.

7 Claims, 12 Drawing Sheets

PRIOR ART

PRIOR ART

SMALL LENS SYSTEM FOR TOF

CROSS REFERENCE TO RELATED APPLICATION

The present application claims priority to Korean Patent Application No. 10-2020-0137367, filed Oct. 22, 2020, the entire contents of which is incorporated herein for all purposes by this reference.

BACKGROUND OF THE INVENTION

Field of the Invention

The present invention relates to a small lens system, and more particularly to a small lens system for TOF configured such that lens sensitivity is excellent, whereby it is possible to provide accurate information, and tolerance sensitivity is alleviated, whereby the performance and productivity of lenses are improved.

Description of the Related Art

With recent increasing demand for high-quality, high-performance, miniaturized, and lightweight electronic equipment having a camera function, research to realize the same through improvement in performance of a subminiature lens optical system has been conducted.

For a small lens system mounted in such miniaturized and lightweight electronic equipment, it is advantageous to reduce the length of lenses (total track length) as much as possible due to limitation in the thickness thereof. In addition, the performance and productivity of the lenses must be excellent, and therefore the lenses must be insensitive to tolerance.

Meanwhile, a TOF (time of flight) camera having TOF technology applied thereto, which is a kind of 3D camera, has been widely used in recent years with increase in performance and function of smartphones, and has also been actively used in self-driving cars, motion recognition control, virtual reality, 3D games, etc.

TOF technology, which measures a distance based on time taken for light to return back after reflection, recognizes the three-dimensional shape of an object using an array type SPAS sensor. The core of TOF technology is to acquire depth information.

However, light may not be properly reflected or may be transmitted depending on a photographing environment or the surface texture or color of an object to be photographed. In this case, it is difficult to acquire accurate depth information.

In a lens system for TOF, therefore, a lens having a small f-number is required in order to further increase lens sensitivity.

For a lens system disclosed in U.S. Pat. No. 8,116,014 B2 shown in FIG. 1A, the f-number of the lens system is 2.8, whereby lenses are slow, the rear surface of a second lens has a small radius of curvature and a high refractive power, whereby the second lens is sensitive to tolerance, and the difference in thickness between the center and the periphery of a fourth lens is great, whereby the fourth lens is sensitive to tolerance. FIG. 1A includes reference labels G1-G4, R1-R10, D1-D10, Z1, St, and Simg.

For a lens system disclosed in U.S. Pat. No. 7,911,715 B1 shown in FIG. 1B, both the front surface and the rear surface of a second lens have small radii of curvature and high refractive powers, whereby the second lens is sensitive to tolerance, and the difference in thickness between the center and the periphery of a fourth lens is great, whereby the fourth lens is sensitive to tolerance. FIG. 1B includes reference labels G1-G4, GF, R1-R2, R4-R9, D1-D11, Z1, St, and 100.

As described above, the conventional technologies have problems in that the f-number is relatively large, and the lenses are sensitive to tolerance, whereby it is difficult to provide accurate 3D information about an object when being applied to a TOF camera, and the performance and productivity of the lenses are low.

SUMMARY OF THE INVENTION

The present invention has been made in view of the above problems, and it is an object of the present invention to provide a small lens system for TOF including a total of four lenses, wherein the thickness of each lens is set, the refractive power and shape of the second lens are adjusted, and an f-number is reduced, whereby lens sensitivity is excellent, and therefore it is possible to provide accurate information, and tolerance sensitivity is alleviated, whereby the performance and productivity of the lenses are improved.

In accordance with the present invention, the above and other objects can be accomplished by the provision of a small lens system for TOF including a first lens, a second lens, a third lens, and a fourth lens sequentially arranged from an object along an optical axis, wherein the thickness ($ct1$) of the first lens, the thickness ($ct3$) of the second lens, the thickness ($ct5$) of the third lens, and the thickness ($ct7$) of the fourth lens satisfy $ct1+ct3>ct5+ct7$, $ct1>ct3$, $ct1>ct5$, and $ct1>ct7$, the front surface of the first lens is convex toward the object while the SAG amount of the first lens is increased depending on the height thereof, the refractive power ($P2$) of the second lens satisfies $-0.01$ mm$^{-1}<P2<0.01$ mm$^{-1}$, the front curvature ($C3$) and the rear curvature ($C4$) of the second lens satisfy $|C3|<0.1$ mm$^{-1}$ and $|C4|<0.1$ mm$^{-1}$, the lens thickness ($et$) at a predetermined height and the center thickness ($ct$) of the second lens thereof satisfy $|et-ct|<5$ μm up to 30% of the height of the rear effective diameter thereof and satisfy $|et-ct|<60$ μm at 70% of the height of the rear effective diameter thereof, and the f-number of the lens system is less than 1.4.

The refractive power ($P1$) of the first lens and the total refractive power ($P$) of the lens system may satisfy $P1/P>0.6$.

The sagittal (SAG) amount (SAGF) of the front surface of the second lens at the effective diameter height thereof may satisfy $SAGF<-0.1$ mm, and the SAG amount (SAGB) of the rear surface of the second lens at the effective diameter height thereof may satisfy $SAGB<-0.08$ mm.

The refractive power ($P3$) of the third lens may satisfy $-0.05$ mm$^{-1}<P3<0.05$ mm$^{-1}$, the front surface of the third lens may be concave toward the object while the SAG amount of the front surface of the third lens may be increased toward the object depending on the height thereof, and the rear surface of the third lens may be convex toward an image while the SAG amount of the rear surface of the third lens may be increased toward the object depending on the height thereof.

The lens thickness ($et$) at the total height of the front effective diameter and the center thickness ($ct$) of the fourth lens thereof may satisfy $|et-ct|<0.2$ mm, and the front surface of the fourth lens may be convex toward the object in the vicinity of the optical axis while the rear surface of the fourth lens may be concave toward the image in the vicinity of the optical axis.

All surfaces of the first lens, the second lens, the third lens, and the fourth lens may be formed as aspherical surfaces, and each of the lenses may be made of plastic.

The wavelength of light used in the small lens system may range from 800 nm to 1100 nm.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention relates to a lens system including a total of four lenses, and more particularly to a small lens system for TOF configured such that a first lens, a second lens, a third lens, and a fourth lens are sequentially arranged from an object along an optical axis and such that the tolerance of the lens system is alleviated while the lens system is small and lightweight by appropriately designing the refractive power, shape, etc. of each lens.

In addition, the present invention provides a small lens system for TOF configured such that the f-number of the lens system is set to be less than 1.4, whereby lens sensitivity is excellent, and therefore it is possible to provide accurate depth information about an object to be photographed while the performance of the lens system is excellent.

In addition, the present invention provides a small lens system for TOF configured such that the relationship in thickness among the first lens, the second lens, the third lens, and the fourth lens is set, the second lens, which is sensitive to tolerance, has a low refractive power, and the curvature and thickness of the second lens are set in order to alleviate tolerance sensitivity, whereby the performance and productivity of the lenses are excellent.

Figure 1A:
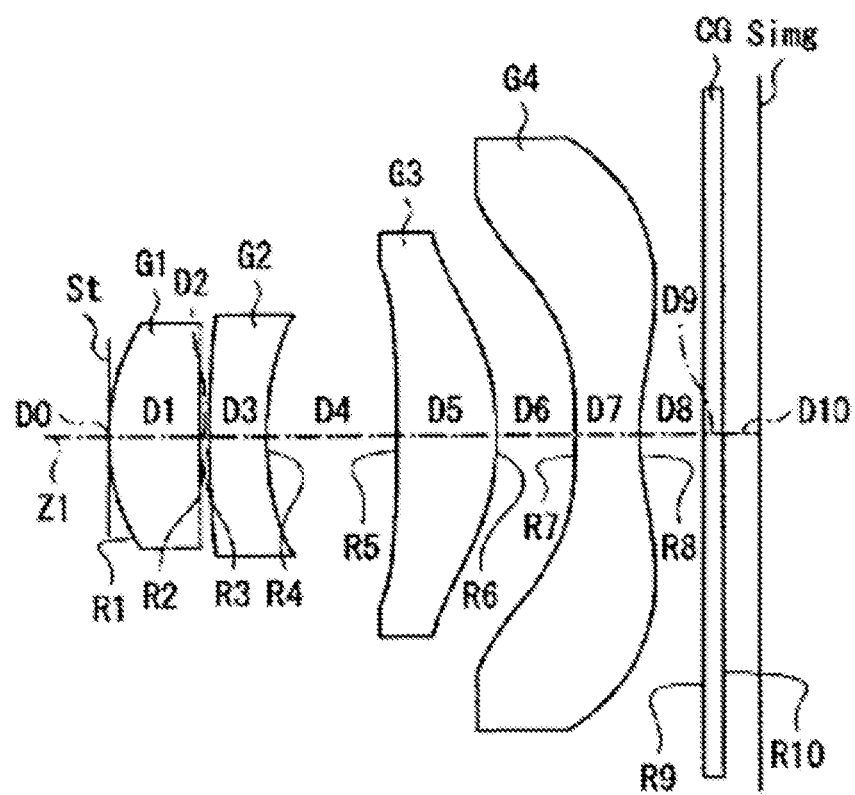
FIG. 1A and FIG. 1B are schematic views showing a conventional small lens system.
Figure 1B:
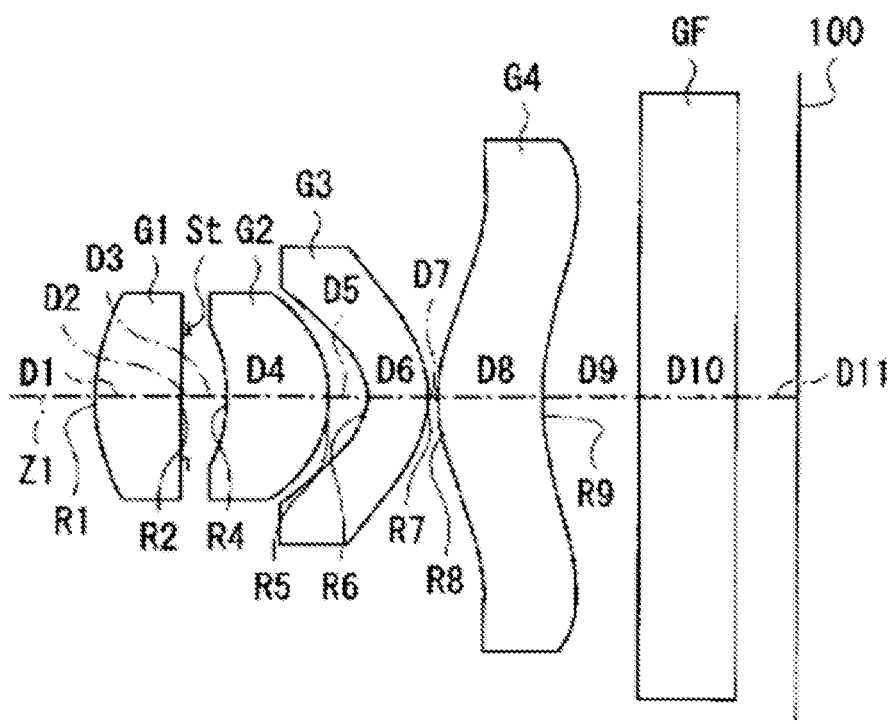
Figure 2:
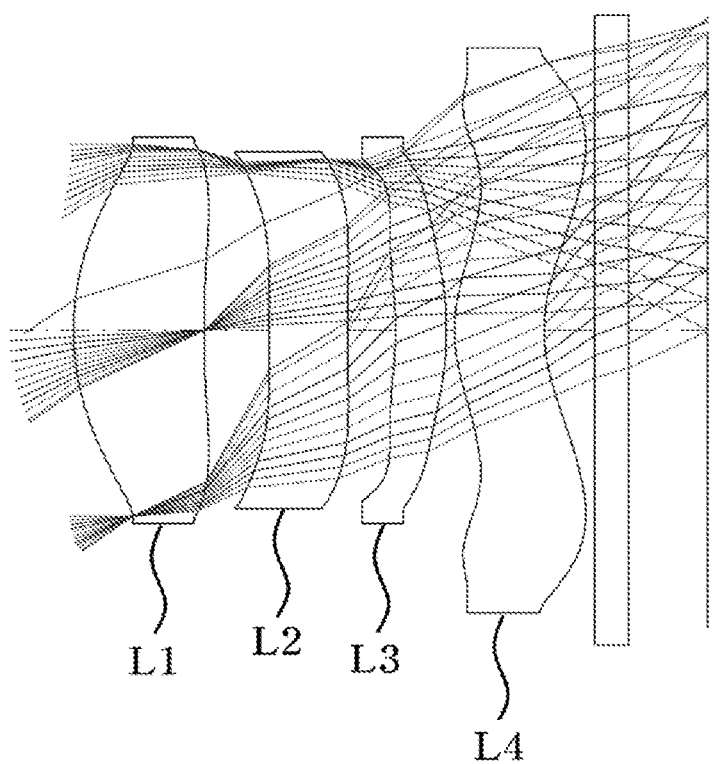
FIG. 2 is a view showing a first embodiment of a small lens system for TOF according to the present invention.
Figure 3:
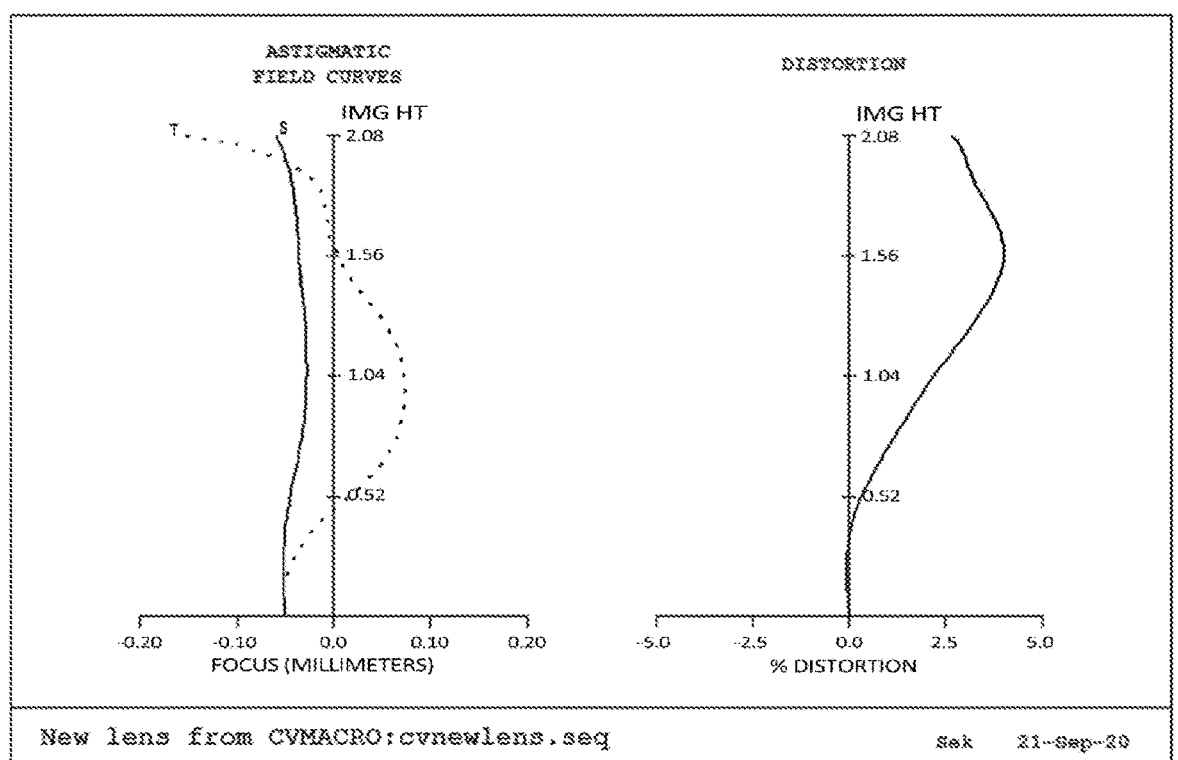
FIG. 3 is a view showing aberration according to a first embodiment of the present invention.
Figure 4:
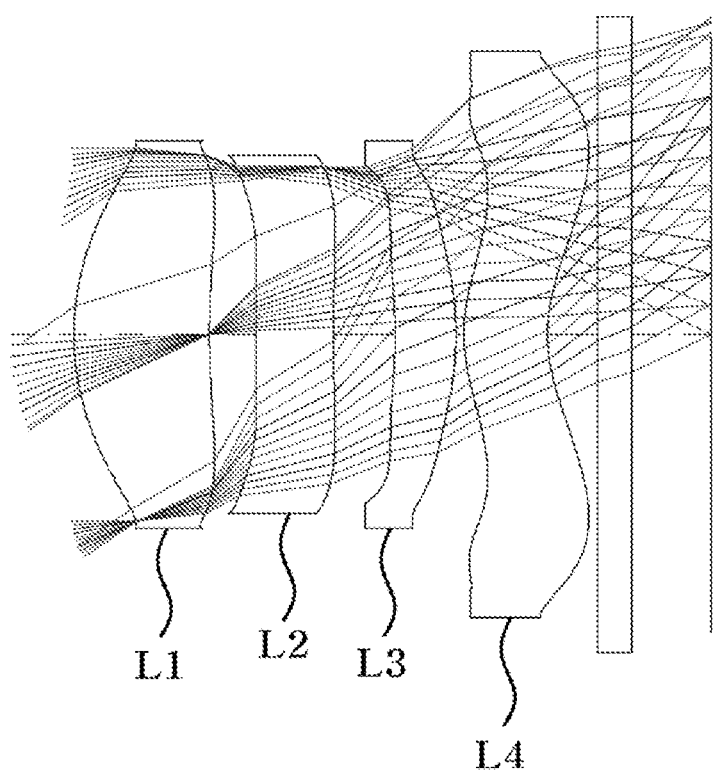
FIG. 4 is a view showing a second embodiment of the small lens system for TOF according to the present invention.
Figure 5:
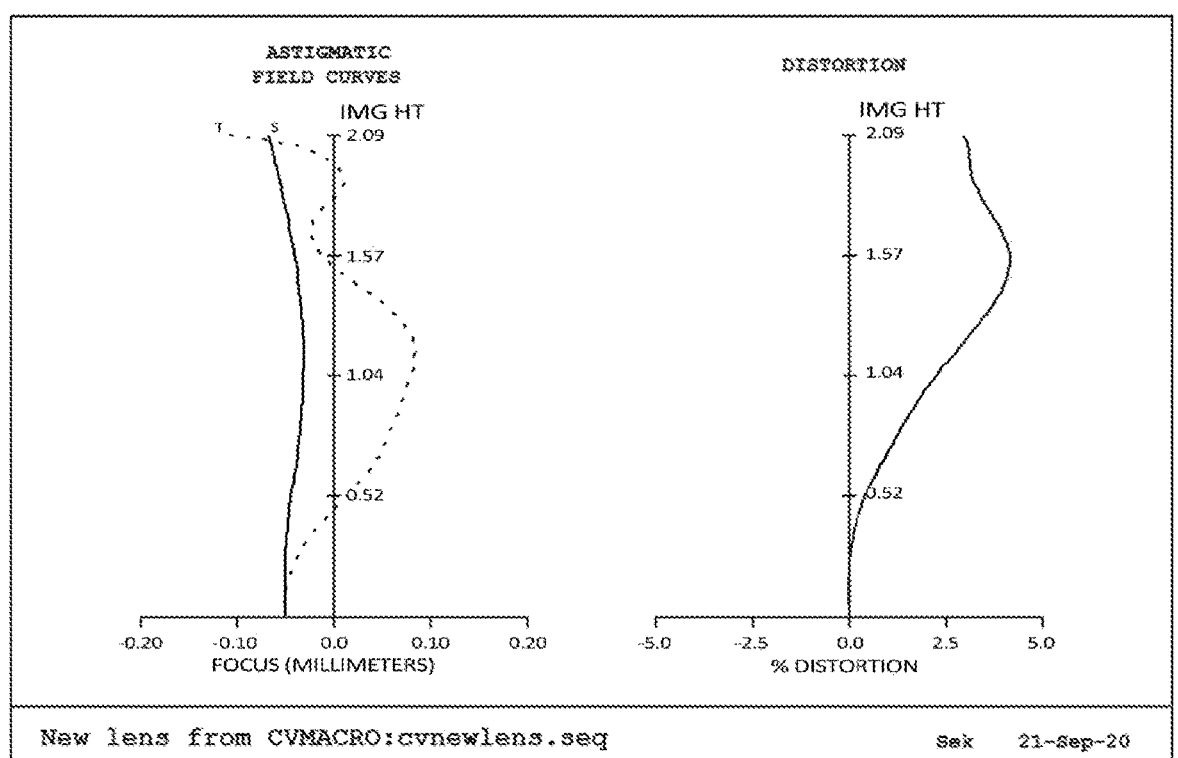
FIG. 5 is a view showing aberration according to a second embodiment of the present invention.
Figure 6:
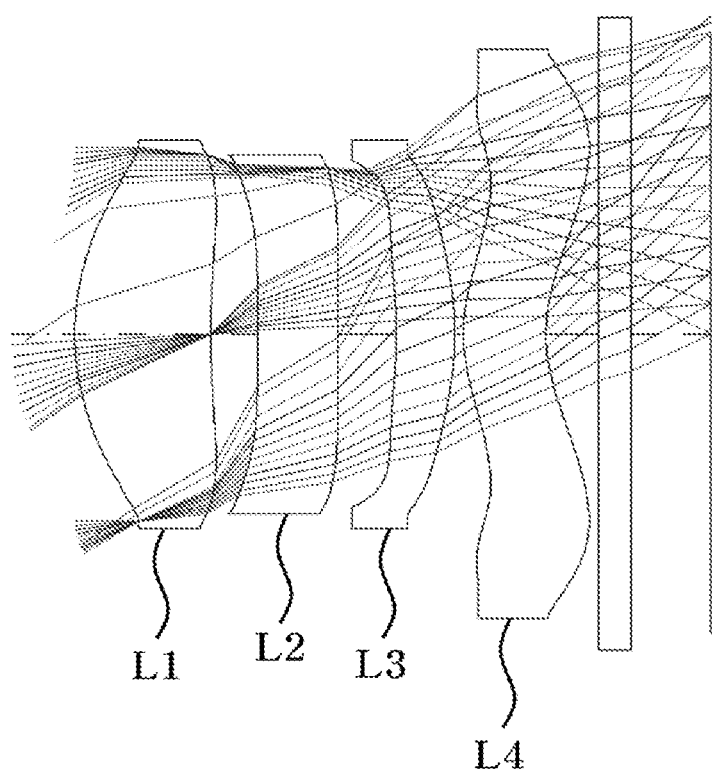
FIG. 6 is a view showing a third embodiment of the small lens system for TOF according to the present invention.
Figure 7:
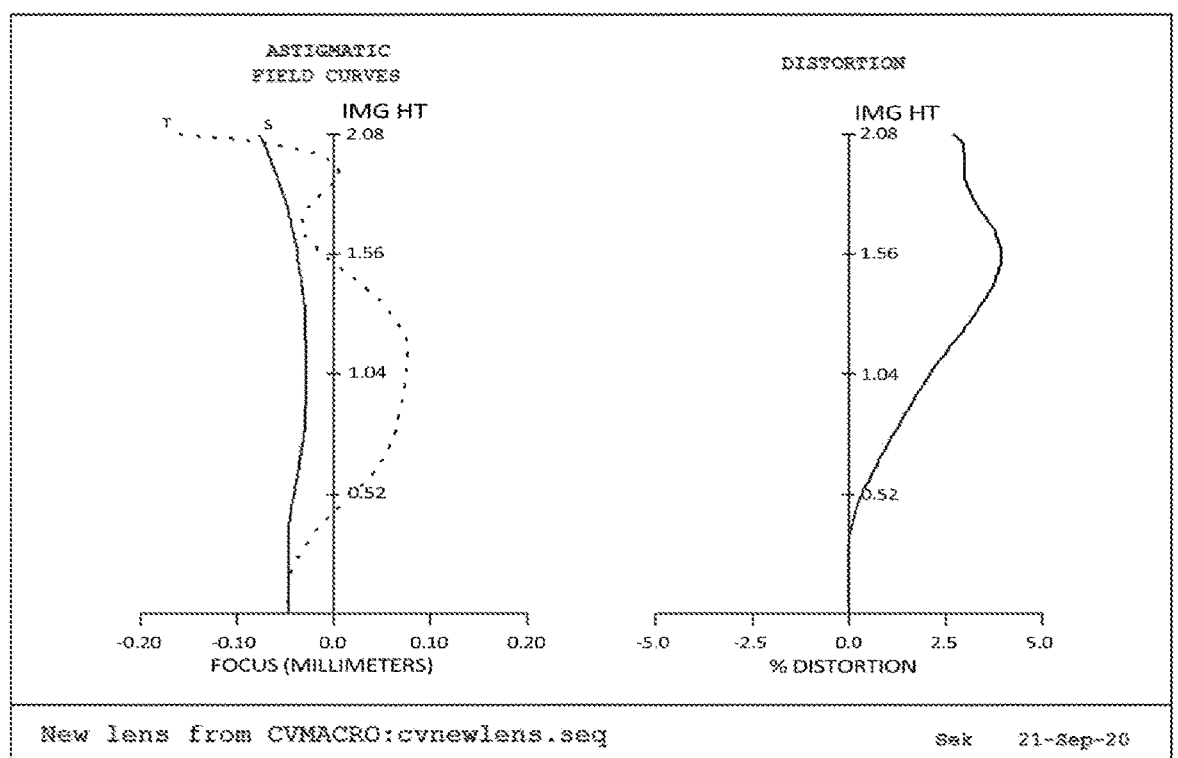
FIG. 7 is a view showing aberration according to a third embodiment of the present invention.
Figure 8:
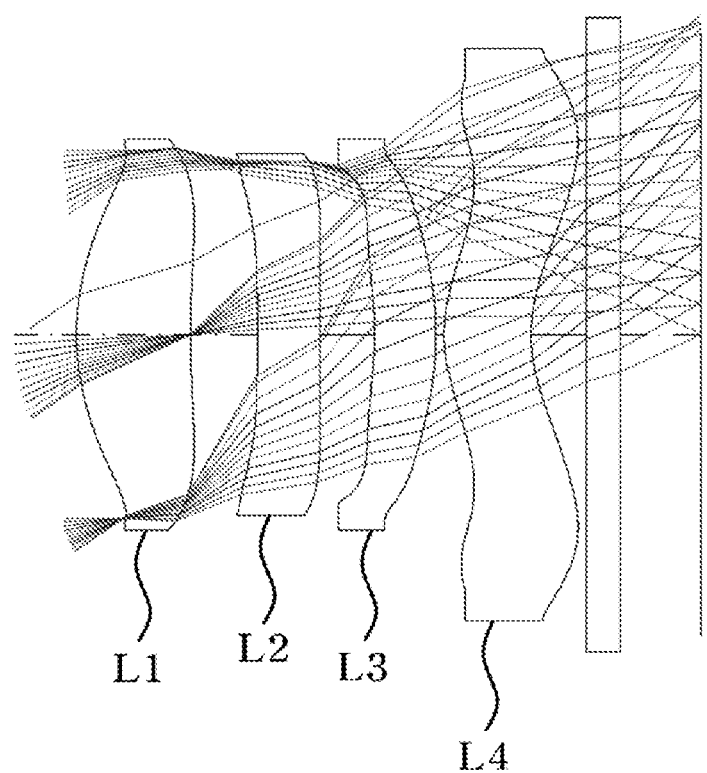
FIG. 8 is a view showing a fourth embodiment of the small lens system for TOF according to the present invention.
Figure 9:
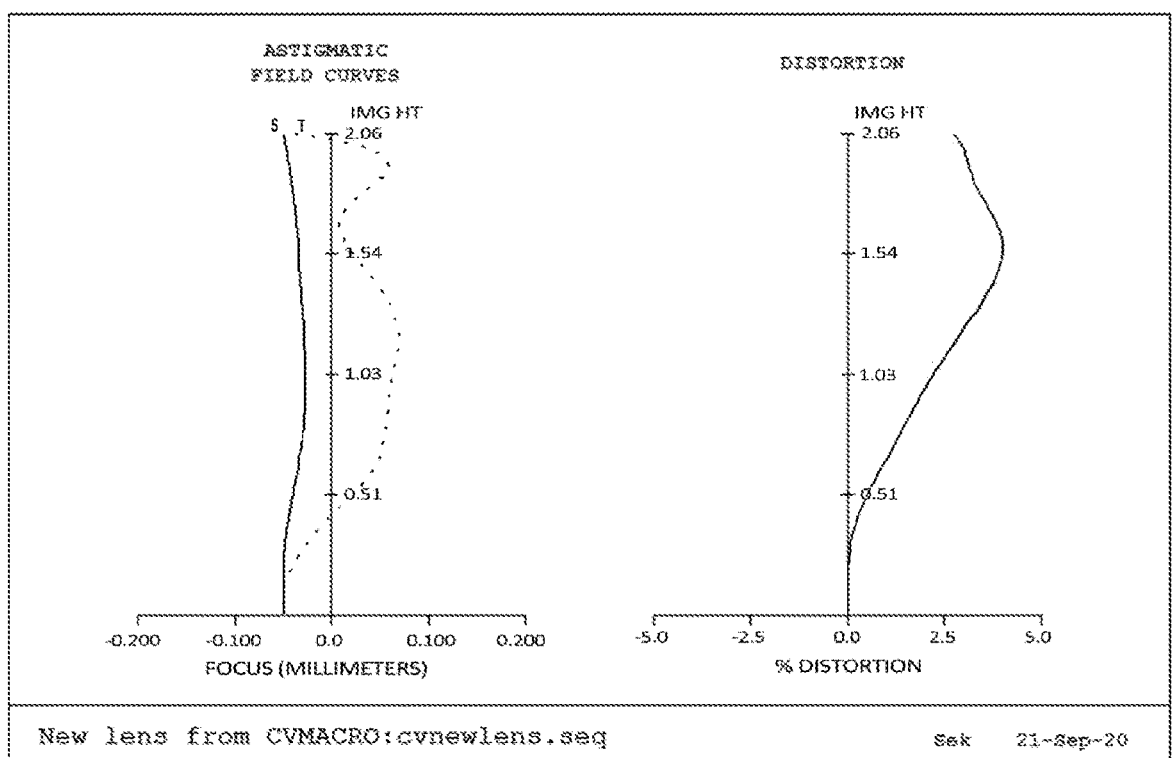
FIG. 9 is a view showing aberration according to a fourth embodiment of the present invention.
Figure 10:
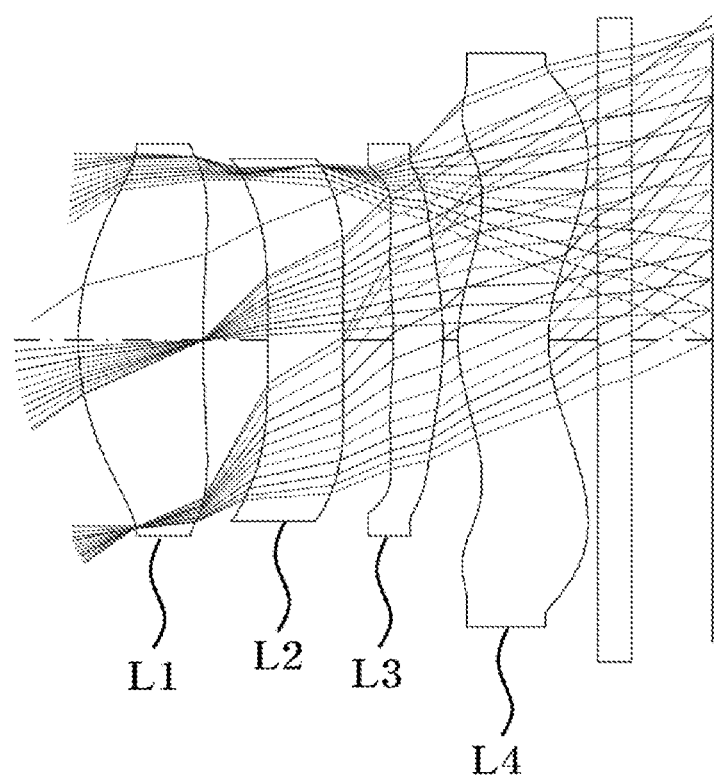
FIG. 10 is a view showing a fifth embodiment of the small lens system for TOF according to the present invention.
Figure 11:
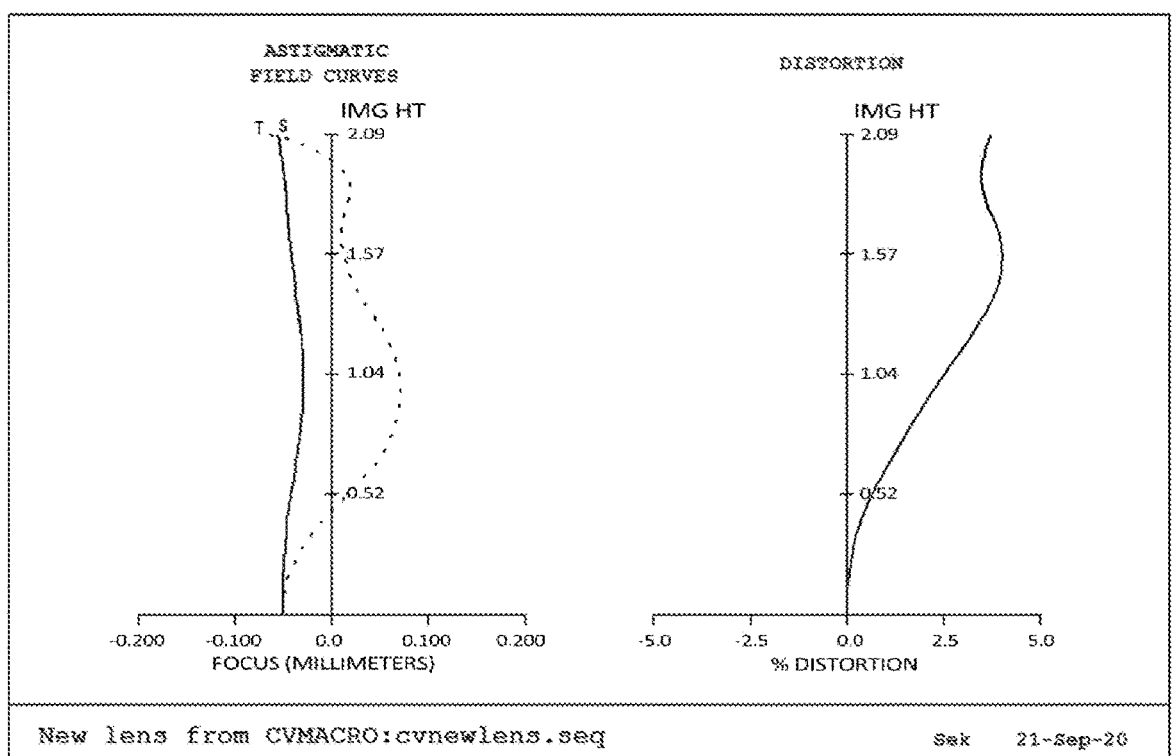
FIG. 11 is a view showing aberration according to a fifth embodiment of the present invention.

Hereinafter, the present invention will be described in detail with reference to the accompanying drawings. FIG. 2 is a view showing a first embodiment of a small lens system for TOF according to the present invention, FIG. 3 is a view showing aberration according to a first embodiment of the present invention, FIG. 4 is a view showing a second embodiment of the small lens system for TOF according to the present invention, FIG. 5 is a view showing aberration according to a second embodiment of the present invention, FIG. 6 is a view showing a third embodiment of the small lens system for TOF according to the present invention, FIG. 7 is a view showing aberration according to a third embodiment of the present invention, FIG. 8 is a view showing a fourth embodiment of the small lens system for TOF according to the present invention, FIG. 9 is a view showing aberration according to a fourth embodiment of the present invention, FIG. 10 is a view showing a fifth embodiment of the small lens system for TOF according to the present invention, and FIG. 11 is a view showing aberration according to a fifth embodiment of the present invention.

As shown, the small lens system for TOF according to the present invention includes a first lens L1, a second lens L2, a third lens L3, and a fourth lens L4 sequentially disposed from an object along an optical axis, wherein the thickness ct1 of the first lens L1, the thickness ct3 of the second lens L2, the thickness ct5 of the third lens L3, and the thickness ct7 of the fourth lens L4 satisfy the following inequalities.

ct1+ct3>ct5+ct7
ct1>ct3
ct1>ct5
ct1>ct7

As defined above, the relationship in thickness among the first to fourth lenses L1 to L4 is set in order to alleviate tolerance sensitivity, whereby a small lens system is provided.

In addition, the front surface of the first lens L1 is convex toward the object, the SAG amount of the first lens is increased, and the tolerance sensitivity of the first lens is alleviated, whereby a lens system that has excellent performance and productivity is provided.

The refractive power P2 of the second lens L2 satisfies $-0.01\ \text{mm}^{-1} < P2 < 0.01\ \text{mm}^{-1}$.

As defined above, the refractive power of the second lens L2, which is sensitive to tolerance, is adjusted to be low in order to alleviate tolerance sensitivity, whereby a lens system that has excellent performance and productivity is provided.

The front curvature C3 and the rear curvature C4 of the second lens L2 are set to satisfy $|C3| < 0.1\ \text{mm}^{-1}$ and $|C4| < 0.1\ \text{mm}^{-1}$ in order to reduce the curvature of the second lens L2, which is sensitive to tolerance, whereby tolerance sensitivity is minimized while a small lens system is provided.

The center thickness ct of the second lens L2 and the lens thickness et of the second lens L2 at a predetermined height thereof satisfy $|et-ct| < 5\ \mu\text{m}$ up to 30% of the height of the rear effective diameter thereof and satisfy $|et-ct| < 60\ \mu\text{m}$ at 70% of the height of the rear effective diameter thereof.

As defined above, the relationship between the lens thickness et and the center thickness ct of the second lens L2, which is sensitive to tolerance, at a predetermined height thereof is set in order to alleviate tolerance sensitivity, whereby a small lens system for TOF that has excellent performance and productivity is provided.

That is, the refractive power, thickness, and shape of the lens system according to the present invention are set in order to reduce tolerance sensitivity and to reduce the total length of the lens system (total track length), whereby a small, lightweight lens system is provided.

The f-number of the lens system according to the present invention is set to be less than 1.4 in order to increase incident light, whereby lens sensitivity is excellent, and therefore it is possible to provide accurate depth information about an object to be photographed. As a result, a small lens system for TOF that has excellent performance is provided.

In addition, the refractive power P1 of the first lens L1 and the total refractive power P of the lens system satisfy P1/P>0.6 such that the refractive power of the first lens L1 is equivalent to 60% or more of the total refractive power of the lens system.

As defined above, the first lens L1 has most of the total refractive power, the second lens L2, which is sensitive to tolerance, has a very low refractive power, and each of the third lens L3 and the fourth lens L4 has a low refractive power, whereby tolerance sensitivity is reduced.

In addition, the SAG amount (SAGF) of the front surface of the second lens L2 at the effective diameter height thereof satisfies SAGF<−0.1 mm, and the SAG amount (SAGB) of the rear surface of the second lens L2 at the effective diameter height thereof satisfies SAGB<−0.08 mm.

As defined above, the SAG amount of the second lens L2 is set to reduce tolerance sensitivity, whereby a small lens system is provided.

In addition, the refractive power P3 of the third lens L3 satisfies $-0.05\ \text{mm}^{-1} < P3 < 0.05\ \text{mm}^{-1}$, the front surface of the third lens L3 is concave toward the object while the SAG amount of the front surface of the third lens L3 is increased toward the object depending on the height thereof, and the rear surface of the third lens L3 is convex toward an image while the SAG amount of the rear surface of the third lens L3 is increased toward the object depending on the height thereof.

As defined above, the refractive power of the third lens L3 is set and the SAG amount of the third lens L3 is set in order to reduce tolerance sensitivity, whereby a lens system that is short, is small, and has a wide angle of view is provided.

In addition, the lens thickness et at the total height of the front effective diameter and the center thickness ct of the fourth lens L4 thereof are set to satisfy |et−ct|<0.2 mm, and the front surface of the fourth lens L4 is convex toward the object in the vicinity of the optical axis while the rear surface of the fourth lens L4 is concave toward the image in the vicinity of the optical axis.

As defined above, the tolerance sensitivity of the fourth lens L4 is alleviated, whereby performance reproducibility of the lens is improved.

In addition, all surfaces of the first lens L1, the second lens L2, the third lens L3, and the fourth lens L4 are formed as aspherical surfaces, and each of the lenses is made of plastic, whereby it is possible to correct spherical aberration and chromatic aberration. Furthermore, each of the lenses is made of a material having a refractive index advantageous to reduce the length thereof, and the lenses are made of materials having Abbe numbers appropriately distributed so as to be advantageous in correcting chromatic aberration.

The wavelength of light used in the small lens system for TOF according to the present invention ranges from 800 nm to 1100 nm, which is a near-infrared range. This is advantageous in acquiring depth information of an object to be photographed.

As described above, the present invention relates to a lens system including a total of four lenses, and more particularly to a lens system configured such that a first lens L1, a second lens L2, a third lens L3, and a fourth lens L4 are sequentially arranged from an object along the optical axis.

As a result, a small lens system for TOF that is small, is lightweight, and has alleviated tolerance is provided.

In addition, the present invention provides a small lens system for TOF configured such that the f-number of the lens system is set to be less than 1.4, whereby lens sensitivity is excellent, and therefore it is possible to provide accurate depth information about an object to be photographed while the performance of the lens system is excellent.

In addition, the present invention provides a small lens system for TOF configured such that the relationship in thickness among the first lens L1, the second lens L2, the third lens L3, and the fourth lens L4 is set, the second lens L2, which is sensitive to tolerance, has a low refractive power, and the curvature and thickness of the second lens L2 are set in order to alleviate tolerance sensitivity, whereby a small lens system that has excellent performance and productivity, is small and lightweight, and has high resolution is provided.

Hereinafter, embodiments of the present invention will be described with reference to the accompanying drawings.

First Embodiment

FIG. 2 is a view showing a first embodiment of the small lens system for TOF according to the present invention.

As shown, in the first embodiment of the small lens system for TOF according to the present invention, a first lens L1, a second lens L2, a third lens L3, and a fourth lens L4 are sequentially arranged from an object along an optical axis.

Table 1 below shows numerical data of the lenses constituting the lens system according to the first embodiment of the present invention.

TABLE 1

| Surface (Surface number) | RDY (Radius of curvature) | THI (Thickness) | Nd (Refractive index) | Vd (Abbe number) |
|---|---|---|---|---|
| OBJECT | INFINITY | INFINITY | | |
| 1 | 1.834 | 0.82 | 1.641 | 19.5 |
| STOP | 6.361 | 0.42 | | |
| 3 | INFINITY | 0.49 | 1.594 | 25.9 |
| 4 | INFINITY | 0.30 | | |
| 5 | −2.025 | 0.32 | 1.641 | 19.5 |
| 6 | −2.332 | 0.05 | | |
| 7 | 1.039 | 0.57 | 1.594 | 25.9 |
| 8 | 1.154 | 0.32 | | |
| 9 | INFINITY | 0.21 | 1.508 | 64.2 |
| 10 | INFINITY | 0.88 | | |
| IMAGE | INFINITY | 0.03 | | |

As shown in FIG. 2, the first lens L1, the second lens L2, the third lens L3, and the fourth lens L4 are sequentially arranged from the object. On the assumption that an optical-axis direction is X and a direction perpendicular to the optical axis is Y, an aspherical equation is defined as expressed by Mathematical Expression 1.

$$X(Y) = \frac{\frac{Y^2}{R}}{1 + \sqrt{1 - (1+K)\left(\frac{Y}{R}\right)^2}} + A_3 Y^4 + A_4 Y^6 + A_5 Y^8 + A_6 Y^{10} + \ldots + A_{14} Y^{26}$$

[Mathematical Expression 1]

An aspherical surface is a curved surface obtained by rotating a curve obtained by the aspherical equation of Mathematical Expression 1 about the optical axis. R indicates the radius of curvature, K indicates a conic constant, and $A_3, A_4, A_5, A_6, \ldots,$ and $A_{11}$ indicate aspherical coefficients.

The aspherical coefficients having data of the respective lenses obtained from Mathematical Expression 1 above are shown in Table 2 below.

TABLE 2

|    | K        | A3       | A4       | A5       | A6       | A7        | A8       | A9        | A10      | A11      |
|----|----------|----------|----------|----------|----------|-----------|----------|-----------|----------|----------|
| s1 | −0.59803 | −0.07065 | 0.46437  | −1.66891 | 3.53484  | −4.67651  | 3.88738  | −1.97575  | 0.56060  | −0.06809 |
| s2 | 22.77590 | −0.01815 | −0.24304 | 0.85404  | −1.95501 | 2.72678   | −2.37800 | 1.26728   | −0.37704 | 0.04775  |
| s3 | 98.81690 | −0.16329 | 0.54031  | −3.05026 | 8.96141  | −15.78280 | 17.30800 | −11.51600 | 4.25020  | −0.66807 |
| s4 | 0.00000  | 0.12552  | −0.80050 | 2.60229  | −6.30524 | 9.88818   | −9.81520 | 6.01705   | −2.09020 | 0.31499  |
| s5 | −35.55100| 0.27841  | −0.24362 | −0.58314 | 3.43089  | −8.43902  | 11.31180 | −8.60528  | 3.46165  | −0.56763 |
| s6 | −0.24053 | −0.21818 | 1.98612  | −7.02870 | 16.20360 | −24.46940 | 23.49890 | −13.80170 | 4.51195  | −0.62636 |
| s7 | −8.38120 | −0.05993 | 0.01525  | −0.27928 | 0.62881  | −0.71698  | 0.95890  | −0.16972  | 0.03095  | −0.00237 |
| s8 | −0.78365 | −0.32068 | 0.19889  | −0.03319 | −0.09126 | 0.09815   | −0.02517 | 0.00738   | −0.00116 | 0.00008  |

According to the first embodiment of the present invention, an f-number is 1.1, and the wavelength of light used in the first embodiment of the present invention is 940 nm.

In addition, according to the first embodiment of the present invention, the thickness ct1 of the first lens L1, the thickness ct3 of the second lens L2, the thickness ct5 of the third lens L3, and the thickness ct7 of the fourth lens L4 satisfy ct1+ct3=1.32 mm and ct5+ct7=0.89 mm, the refractive power P2 of the second lens L2 satisfies P2=0 mm$^{-1}$, the refractive power P3 of the third lens L3 satisfies P3=−0.02 mm$^{-1}$, the front curvature C3 and the rear curvature C4 of the second lens L2 satisfy |C3|=0 and |C4|=0, and the lens thickness et at a predetermined height and the center thickness ct of the second lens L2 thereof satisfy |et−ct|=3 μm up to 30% of the height of the rear effective diameter of the second lens L2 and satisfy |et−ct|=42 μm at 70% of the height of the rear effective diameter of the second lens L2.

In addition, according to the first embodiment of the present invention, the SAG amount (SAGF) of the front surface of the second lens L2 at the effective diameter height thereof satisfies SAGF=−0.22 mm, and the SAG amount (SAGB) of the rear surface of the second lens L2 at the effective diameter height thereof satisfies SAGB=−0.16 mm.

In addition, according to the first embodiment of the present invention, the refractive power P1 of the first lens L1 and the total refractive power P of the lens system satisfy P1/P=0.72.

In addition, according to the first embodiment of the present invention, the lens thickness et at the total height of the front effective diameter and the center thickness ct of the fourth lens L4 thereof satisfy |et−ct|=0.1 mm.

FIG. 3 is a view showing aberration according to a first embodiment of the present invention.

First data of FIG. 3 show astigmatism, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism. The astigmatism according to the first embodiment of the present invention is 0.025 mm (focus) or less, which is determined to be good.

Second data of FIG. 3 show distortion aberration, wherein the horizontal axis indicates distortion degree (%), and the vertical axis indicates image height (mm). In general, it is known that, in the case in which an aberration curve is within a range of −2 to 2%, distortion aberration is good.

Optical distortion, as the distortion aberration according to the first embodiment of the present invention, is 2% or less, which is determined to be good.

Second Embodiment

FIG. 4 is a view showing a second embodiment of the small lens system for TOF according to the present invention.

As shown, in the first embodiment of the small lens system for TOF according to the present invention, a first lens L1, a second lens L2, a third lens L3, and a fourth lens L4 are sequentially arranged from an object along an optical axis.

Table 3 below shows numerical data of the lenses constituting the lens system according to the second embodiment of the present invention.

TABLE 3

| Surface (Surface number) | RDY (Radius of curvature) | THI (Thickness) | Nd (Refractive index) | Vd (Abbe number) |
|---|---|---|---|---|
| OBJECT | INFINITY | INFINITY | | |
| 1      | 1.841    | 0.85     | 1.641 | 19.5 |
| STOP   | 6.100    | 0.30     |       |      |
| 3      | 20.505   | 0.49     | 1.594 | 25.9 |
| 4      | 24.111   | 0.39     |       |      |
| 5      | −2.665   | 0.38     | 1.641 | 19.5 |
| 6      | −2.451   | 0.05     |       |      |
| 7      | 1.121    | 0.52     | 1.594 | 25.9 |
| 8      | 1.131    | 0.32     |       |      |
| 9      | INFINITY | 0.21     | 1.508 | 64.2 |
| 10     | INFINITY | 1.00     |       |      |
| IMAGE  | INFINITY | 0.03     |       |      |

As shown in FIG. 4, the first lens L1, the second lens L2, the third lens L3, and the fourth lens L4 are sequentially arranged from the object. On the assumption that an optical-axis direction is X and a direction perpendicular to the optical axis is Y, an aspherical equation is defined as expressed by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{11}$ indicate aspherical coefficients.

The aspherical coefficients having data of the respective lenses obtained from Mathematical Expression 1 above are shown in Table 4 below.

TABLE 4

| | K | A3 | A4 | A5 | A6 | A7 | A8 | A9 | A80 | A11 |
|---|---|---|---|---|---|---|---|---|---|---|
| s1 | −0.39642 | −0.07477 | 0.46838 | −1.67143 | 3.53480 | −4.67559 | 3.88768 | −1.97600 | 0.56060 | −0.06809 |
| s2 | 21.01080 | −0.01343 | −0.25334 | 0.85504 | −1.95246 | 2.72740 | −2.37879 | 1.26728 | −0.37704 | 0.04775 |
| s3 | 98.81690 | −0.12535 | 0.52993 | −3.06421 | 8.95757 | −15.77720 | 17.30800 | −11.51600 | 4.25020 | −0.66807 |
| s4 | 0.00000 | 0.12036 | −0.74112 | 2.58185 | −6.33338 | 9.90213 | −9.81520 | 6.01705 | −2.09020 | 0.31499 |
| s5 | −50.58610 | 0.21190 | −0.21491 | −0.52979 | 3.39498 | −8.43902 | 11.31180 | −8.60528 | 3.46165 | −0.56763 |
| s6 | 1.34933 | −0.24326 | 1.98423 | −7.00032 | 16.20980 | −24.47800 | 23.49890 | −13.80170 | 4.51195 | −0.62636 |
| s7 | −9.34444 | −0.06175 | 0.02227 | −0.28139 | 0.62854 | −0.71673 | 0.45891 | −0.16466 | 0.03096 | −0.00238 |
| s8 | −2.42431 | −0.20821 | 0.12507 | −0.02981 | −0.04132 | 0.04827 | −0.02520 | 0.00737 | −0.00116 | 0.00008 |

According to the second embodiment of the present invention, an f-number is 1.1, and the wavelength of light used in the second embodiment of the present invention is 940 nm.

In addition, according to the second embodiment of the present invention, the thickness ct1 of the first lens L1, the thickness ct3 of the second lens L2, the thickness ct5 of the third lens L3, and the thickness ct7 of the fourth lens L4 satisfy ct1+ct3=1.33 mm and ct5+ct7=0.9 mm, the refractive power P2 of the second lens L2 satisfies P2=0.005 mm$^{-1}$, the refractive power P3 of the third lens L3 satisfies P3=−0.035 mm$^{-1}$, the front curvature C3 and the rear curvature C4 of the second lens L2 satisfy |C3|=0.05 mm$^{-1}$ and |C4|=0.05 mm$^{-1}$, and the lens thickness et at a predetermined height and the center thickness ct of the second lens L2 thereof satisfy |et−ct|=2 μm up to 30% of the height of the rear effective diameter of the second lens L2 and satisfy |et−ct|=37 μm at 70% of the height of the rear effective diameter of the second lens L2.

In addition, according to the second embodiment of the present invention, the SAG amount (SAGF) of the front surface of the second lens L2 at the effective diameter height thereof satisfies SAGF=−0.17 mm, and the SAG amount (SAGB) of the rear surface of the second lens L2 at the effective diameter height thereof satisfies SAGB=−0.10 mm.

In addition, according to the second embodiment of the present invention, the refractive power P1 of the first lens L1 and the total refractive power P of the lens system satisfy P1/P=0.72.

In addition, according to the second embodiment of the present invention, the lens thickness et at the total height of the front effective diameter and the center thickness ct of the fourth lens L4 thereof satisfy |et−ct|=0.11 mm.

FIG. 5 is a view showing aberration according to a second embodiment of the present invention.

First data of FIG. 5 show astigmatism, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism. The astigmatism according to the second embodiment of the present invention is 0.025 mm (focus) or less, which is determined to be good.

Second data of FIG. 5 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the second embodiment of the present invention, is 2% or less, which is determined to be good.

Third Embodiment

FIG. 6 is a view showing a third embodiment of the small lens system for TOF according to the present invention.

As shown, in the third embodiment of the small lens system for TOF according to the present invention, a first lens L1, a second lens L2, a third lens L3, and a fourth lens L4 are sequentially arranged from an object along an optical axis.

Table 5 below shows numerical data of the lenses constituting the lens system according to the third embodiment of the present invention.

TABLE 5

| Surface (Surface number) | RDY (Radius of curvature) | THI (Thickness) | Nd (Refractive index) | Vd (Abbe number) |
|---|---|---|---|---|
| OBJECT | INFINITY | INFINITY | | |
| 1 | 1.814 | 0.85 | 1.641 | 19.5 |
| STOP | 6.192 | 0.29 | | |
| 3 | −443.879 | 0.50 | 1.594 | 25.9 |
| 4 | −631.541 | 0.37 | | |
| 5 | −2.464 | 0.37 | 1.641 | 19.5 |
| 6 | −2.447 | 0.05 | | |
| 7 | 1.085 | 0.52 | 1.594 | 25.9 |
| 8 | 1.132 | 0.33 | | |
| 9 | INFINITY | 0.21 | 1.508 | 64.2 |
| 10 | INFINITY | 1.00 | | |
| IMAGE | INFINITY | 0.03 | | |

As shown in FIG. 6, the first lens L1, the second lens L2, the third lens L3, and the fourth lens L4 are sequentially arranged from the object. On the assumption that an optical-axis direction is X and a direction perpendicular to the optical axis is Y, an aspherical equation is defined as expressed by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{11}$ indicate aspherical coefficients.

The aspherical coefficients having data of the respective lenses obtained from Mathematical Expression 1 above are shown in Table 6 below.

TABLE 6

|  | K | A3 | A4 | A5 | A6 | A7 | A8 | A9 | A10 | A11 |
|---|---|---|---|---|---|---|---|---|---|---|
| s1 | −0.36745 | −0.07431 | 0.46968 | −1.67195 | 3.53478 | −4.67535 | 3.88779 | −1.97614 | 0.56059 | −0.06809 |
| s2 | 21.49350 | −0.01079 | −0.25158 | 0.85424 | −1.95306 | 2.72714 | −2.37859 | 1.26735 | −0.37703 | 0.04775 |
| s3 | 98.81690 | −0.12333 | 0.54414 | −3.06552 | 8.95265 | −15.77520 | 17.30820 | −11.51590 | 4.25020 | −0.66807 |
| s4 | 0.00000 | 0.11862 | −0.71965 | 2.57904 | −6.33909 | 9.90506 | −9.81568 | 6.01680 | −2.09020 | 0.31499 |
| s5 | −40.30420 | 0.21367 | −0.22777 | −0.52315 | 3.39806 | −8.44415 | 11.31100 | −8.60528 | 3.46165 | −0.56763 |
| s6 | 0.82741 | −0.24759 | 1.97464 | −6.99710 | 16.21090 | −24.48310 | 23.50040 | −13.80140 | 4.51195 | −0.62636 |
| s7 | −8.41394 | −0.05351 | 0.02380 | −0.28105 | 0.62772 | −0.71670 | 0.45886 | −0.16465 | 0.03098 | −0.00239 |
| s8 | −1.52351 | −0.26559 | 0.15075 | −0.03491 | −0.04173 | 0.04847 | −0.02520 | 0.00739 | −0.00116 | 0.00008 |

According to the third embodiment of the present invention, an f-number is 1.1, and the wavelength of light used in the third embodiment of the present invention is 940 nm.

In addition, according to the third embodiment of the present invention, the thickness ct1 of the first lens L1, the thickness ct3 of the second lens L2, the thickness ct5 of the third lens L3, and the thickness ct7 of the fourth lens L4 satisfy ct1+ct3=1.35 mm and ct5+ct7=0.88 mm, the refractive power P2 of the second lens L2 satisfies P2=0, the refractive power P3 of the third lens L3 satisfies P3=0.017 mm$^{-1}$, the front curvature C3 and the rear curvature C4 of the second lens L2 satisfy |C3|=0.002 mm$^{-1}$ and |C4|=0.002 mm$^{-1}$, and the lens thickness et at a predetermined height and the center thickness ct of the second lens L2 thereof satisfy |et−ct|=2 μm up to 30% of the height of the rear effective diameter of the second lens L2 and satisfy |et−ct|=41 μm at 70% of the height of the rear effective diameter of the second lens L2.

In addition, according to the third embodiment of the present invention, the SAG amount (SAGF) of the front surface of the second lens L2 at the effective diameter height thereof satisfies SAGF=−0.18 mm, and the SAG amount (SAGB) of the rear surface of the second lens L2 at the effective diameter height thereof satisfies SAGB=−0.10 mm.

In addition, according to the third embodiment of the present invention, the refractive power P1 of the first lens L1 and the total refractive power P of the lens system satisfy P1/P=0.73.

In addition, according to the third embodiment of the present invention, the lens thickness et at the total height of the front effective diameter and the center thickness ct of the fourth lens L4 thereof satisfy |et−ct|=0.1 mm.

FIG. 7 is a view showing aberration according to a third embodiment of the present invention.

First data of FIG. 7 show astigmatism, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism. The astigmatism according to the third embodiment of the present invention is 0.025 mm (focus) or less, which is determined to be good.

Second data of FIG. 7 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the third embodiment of the present invention, is 2% or less, which is determined to be good.

Fourth Embodiment

FIG. 8 is a view showing a fourth embodiment of the small lens system for TOF according to the present invention.

As shown, in the fourth embodiment of the small lens system for TOF according to the present invention, a first lens L1, a second lens L2, a third lens L3, and a fourth lens L4 are sequentially arranged from an object along an optical axis.

Table 7 below shows numerical data of the lenses constituting the lens system according to the fourth embodiment of the present invention.

TABLE 7

| Surface (Surface number) | RDY (Radius of curvature) | THI (Thickness) | Nd (Refractive index) | Vd (Abbe number) |
|---|---|---|---|---|
| OBJECT | INFINITY | INFINITY | | |
| 1 | 1.838 | 0.71 | 1.641 | 19.5 |
| STOP | 7.155 | 0.41 | | |
| 3 | INFINITY | 0.39 | 1.594 | 25.9 |
| 4 | INFINITY | 0.34 | | |
| 5 | −2.192 | 0.38 | 1.641 | 19.5 |
| 6 | −2.554 | 0.05 | | |
| 7 | 1.004 | 0.54 | 1.594 | 25.9 |
| 8 | 1.110 | 0.35 | | |
| 9 | INFINITY | 0.21 | 1.508 | 64.2 |
| 10 | INFINITY | 0.98 | | |
| IMAGE | INFINITY | 0.03 | | |

As shown in FIG. 8, the first lens L1, the second lens L2, the third lens L3, and the fourth lens L4 are sequentially arranged from the object. On the assumption that an optical-axis direction is X and a direction perpendicular to the optical axis is Y, an aspherical equation is defined as expressed by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, ..., and $A_{11}$ indicate aspherical coefficients.

The aspherical coefficients having data of the respective lenses obtained from Mathematical Expression 1 above are shown in Table 8 below.

TABLE 8

|  | K | A3 | A4 | A5 | A6 | A7 | A8 | A9 | A10 | A11 |
|---|---|---|---|---|---|---|---|---|---|---|
| s1 | −0.69143 | −0.07229 | 0.45977 | −1.67113 | 3.53336 | −4.67740 | 3.88700 | −1.97575 | 0.56060 | −0.06809 |
| s2 | 28.02640 | −0.02452 | −0.24608 | 0.85367 | −1.95499 | 2.72677 | −2.37795 | 1.26740 | −0.37704 | 0.04775 |
| s3 | 98.81690 | −0.14011 | 0.54093 | −3.04202 | 8.96281 | −15.78270 | 17.30800 | −11.51600 | 4.25020 | −0.66807 |
| s4 | 0.00000 | 0.14430 | −0.77670 | 2.60768 | −6.30569 | 9.88090 | −9.81519 | 6.01705 | −2.09020 | 0.31499 |
| s5 | −33.96950 | 0.23044 | −0.23802 | −0.55700 | 3.43515 | −8.45566 | 11.31180 | −8.60528 | 3.46165 | −0.56763 |
| s6 | 1.20745 | −0.27709 | 1.99293 | −7.00600 | 16.20550 | −24.47390 | 23.49630 | −13.80020 | 4.51195 | −0.62636 |
| s7 | −7.55137 | −0.04462 | 0.01452 | −0.27997 | 0.62851 | −0.71657 | 0.45888 | −0.16472 | 0.03096 | −0.00237 |
| s8 | −0.80266 | −0.31987 | 0.14864 | −0.03343 | −0.04127 | 0.04819 | −0.02516 | 0.00738 | −0.00116 | 0.00008 |

According to the fourth embodiment of the present invention, an f-number is 1.1, and the wavelength of light used in the fourth embodiment of the present invention is 940 nm.

In addition, according to the fourth embodiment of the present invention, the thickness ct1 of the first lens L1, the thickness ct3 of the second lens L2, the thickness ct5 of the third lens L3, and the thickness ct7 of the fourth lens L4 satisfy ct1+ct3=1.1 mm and ct5+ct7=0.92 mm, the refractive power P2 of the second lens L2 satisfies P2=0 mm$^{-1}$, the refractive power P3 of the third lens L3 satisfies P3=−0.02 mm$^{-1}$, the front curvature C3 and the rear curvature C4 of the second lens L2 satisfy |C3|=0 and |C4|=0, and the lens thickness et at a predetermined height and the center thickness ct of the second lens L2 thereof satisfy |et−ct|=3 μm up to 30% of the height of the rear effective diameter of the second lens L2 and satisfy |et−ct|=46 μm at 70% of the height of the rear effective diameter of the second lens L2.

In addition, according to the fourth embodiment of the present invention, the SAG amount (SAGF) of the front surface of the second lens L2 at the effective diameter height thereof satisfies SAGF=−0.12 mm, and the SAG amount (SAGB) of the rear surface of the second lens L2 at the effective diameter height thereof satisfies SAGB=−0.1 mm.

In addition, according to the fourth embodiment of the present invention, the refractive power P1 of the first lens L1 and the total refractive power P of the lens system satisfy P1/P=0.73.

In addition, according to the fourth embodiment of the present invention, the lens thickness et at the total height of the front effective diameter and the center thickness ct of the fourth lens L4 thereof satisfy |et−ct|=0.1 mm.

FIG. 9 is a view showing aberration according to a fourth embodiment of the present invention.

First data of FIG. 9 show astigmatism, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism. The astigmatism according to the fourth embodiment of the present invention is 0.025 mm (focus) or less, which is determined to be good.

Second data of FIG. 9 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the fourth embodiment of the present invention, is 2% or less, which is determined to be good.

Fifth Embodiment

FIG. 10 is a view showing a fifth embodiment of the small lens system for TOF according to the present invention.

As shown, in the fifth embodiment of the small lens system for TOF according to the present invention, a first lens L1, a second lens L2, a third lens L3, and a fourth lens L4 are sequentially arranged from an object along an optical axis.

Table 9 below shows numerical data of the lenses constituting the lens system according to the fifth embodiment of the present invention.

TABLE 9

| Surface (Surface number) | RDY (Radius of curvature) | THI (Thickness) | Nd (Refractive index) | Vd (Abbe number) |
|---|---|---|---|---|
| OBJECT | INFINITY | INFINITY | | |
| 1 | 1.841 | 0.77 | 1.641 | 19.5 |
| STOP | 6.538 | 0.40 | | |
| 3 | INFINITY | 0.47 | 1.594 | 25.9 |
| 4 | INFINITY | 0.31 | | |
| 5 | −2.656 | 0.31 | 1.641 | 19.5 |
| 6 | −2.756 | 0.09 | | |
| 7 | 1.099 | 0.56 | 1.594 | 25.9 |
| 8 | 1.190 | 0.31 | | |
| 9 | INFINITY | 0.21 | 1.508 | 64.2 |
| 10 | INFINITY | 0.89 | | |
| IMAGE | INFINITY | 0.03 | | |

As shown in FIG. 10, the first lens L1, the second lens L2, the third lens L3, and the fourth L4 are sequentially arranged from the object. On the assumption that an optical-axis direction is X and a direction perpendicular to the optical axis is Y, an aspherical equation is defined as expressed by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{11}$ indicate aspherical coefficients.

The aspherical coefficients having data of the respective lenses obtained from Mathematical Expression 1 above are shown in Table 10 below.

TABLE 10

|  | K | A3 | A4 | A5 | A6 | A7 | A8 | A9 | A10 | A11 |
|---|---|---|---|---|---|---|---|---|---|---|
| s1 | −0.63171 | −0.07117 | 0.46302 | −1.66929 | 3.53482 | −4.67662 | 3.88710 | −1.97575 | 0.56060 | −0.06809 |
| s2 | 24.24450 | −0.01992 | −0.24384 | 0.85402 | −1.95491 | 2.72678 | −2.37810 | 1.26728 | −0.37704 | 0.04775 |

TABLE 10-continued

|  | K | A3 | A4 | A5 | A6 | A7 | A8 | A9 | A10 | A11 |
|---|---|---|---|---|---|---|---|---|---|---|
| s3 | 98.81690 | −0.16237 | 0.54038 | −3.05206 | 8.95983 | −15.78170 | 17.30800 | −11.51600 | 4.25020 | −0.66807 |
| s4 | 0.00000 | 0.11670 | −0.80223 | 2.60367 | −6.30403 | 9.88801 | −9.81520 | 6.01705 | −2.09020 | 0.31499 |
| s5 | −52.46850 | 0.29169 | −0.24739 | −0.57583 | 3.42932 | −8.43902 | 11.31180 | −8.60528 | 3.46165 | −0.56763 |
| s6 | −0.24299 | −0.21656 | 1.99144 | −7.03240 | 16.20420 | −24.46930 | 23.49890 | −13.80170 | 4.51195 | −0.62636 |
| s7 | −9.07820 | −0.06164 | 0.01190 | −0.27949 | 0.62924 | −0.71631 | 0.45899 | −0.16474 | 0.03093 | −0.00237 |
| s8 | −0.86422 | −0.30636 | 0.14502 | −0.03258 | −0.04105 | 0.04817 | −0.02518 | 0.00738 | −0.00116 | 0.00008 |

According to the fifth embodiment of the present invention, an f-number is 1.1, and the wavelength of light used in the fifth embodiment of the present invention is 940 nm.

In addition, according to the fifth embodiment of the present invention, the thickness ct1 of the first lens L1, the thickness ct3 of the second lens L2, the thickness ct5 of the third lens L3, and the thickness ct7 of the fourth lens L4 satisfy ct1+ct3=1.24 mm and ct5+ct7=0.87 mm, the refractive power P2 of the second lens L2 satisfies P2=0 mm$^{-1}$, the refractive power P3 of the third lens L3 satisfies P3=0.002 mm$^{-1}$, the front curvature C3 and the rear curvature C4 of the second lens L2 satisfy |C3|=0 and |C4|=0, and the lens thickness et at a predetermined height and the center thickness ct of the second lens L2 thereof satisfy |et−ct|=3 μm up to 30% of the height of the rear effective diameter of the second lens L2 and satisfy |et−ct|=38 μm at 70% of the height of the rear effective diameter of the second lens L2.

In addition, according to the fifth embodiment of the present invention, the SAG amount (SAGF) of the front surface of the second lens L2 at the effective diameter height thereof satisfies SAGF=−0.23 mm, and the SAG amount (SAGB) of the rear surface of the second lens L2 at the effective diameter height thereof satisfies SAGB=−0.17 mm.

In addition, according to the fifth embodiment of the present invention, the refractive power P1 of the first lens L1 and the total refractive power P of the lens system satisfy P1/P=0.72.

In addition, according to the fifth embodiment of the present invention, the lens thickness et at the total height of the front effective diameter and the center thickness ct of the fourth lens L4 thereof satisfy |et−ct|=0.1 mm.

FIG. 11 is a view showing aberration according to a fifth embodiment of the present invention.

First data of FIG. 11 show astigmatism, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism. The astigmatism according to the fifth embodiment of the present invention is 0.025 mm (focus) or less, which is determined to be good.

Second data of FIG. 11 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the fifth embodiment of the present invention, is 2% or less, which is determined to be good.

As is apparent from the above description, the present invention has an effect of providing a lens system including a first lens, a second lens, a third lens, and a fourth lens sequentially arranged from an object along an optical axis, particularly a small lens system for TOF configured such that the tolerance of the lens system is alleviated while the lens system is small and lightweight by appropriately designing the refractive power, shape, etc. of each lens.

In addition, the present invention provides a small lens system for TOF configured such that the f-number of the lens system is set to be less than 1.4, whereby lens sensitivity is excellent, and therefore it is possible to provide accurate depth information about an object to be photographed while the performance of the lens system is excellent.

In particular, the present invention provides a small lens system for TOF configured such that the relationship in thickness among the first lens, the second lens, the third lens, and the fourth lens is set, the second lens, which is sensitive to tolerance, has a low refractive power, and the curvature and thickness of the second lens are set in order to alleviate tolerance sensitivity, whereby the performance and productivity of the lenses are excellent.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A small lens system for a time of flight (TOF) camera comprising a first lens, a second lens, a third lens, and a fourth lens sequentially arranged from an object along an optical axis, wherein
   a center thickness (ct1) of the first lens, a center thickness (ct3) of the second lens, a center thickness (ct5) of the third lens, and a center thickness (ct7) of the fourth lens satisfy ct1+ct3>ct5+ct7, ct1>ct3, ct1>ct5, and ct1>ct7,
   a front surface of the first lens is convex toward the object while a sagittal (SAG) amount of the first lens is increased depending on a height thereof,
   a refractive power (P2) of the second lens satisfies −0.01 mm$^{-1}$<P2<0.01 mm$^{-1}$,
   a front curvature (C3) and a rear curvature (C4) of the second lens satisfy |C3|<0.1 mm$^{-1}$ and |C4|<0.1 mm$^{-1}$,
   a lens thickness (et3) at a predetermined height and the center thickness (ct3) of the second lens thereof satisfy |et3|ct3|<5 μm throughout a range of 0-30% of a height of a rear effective radius thereof and satisfy |et3|ct3|<60 μm at 70% of the height of the rear effective radius thereof, and
   an f-number of the lens system is less than 1.4.

2. The small lens system according to claim 1, wherein a refractive power (P1) of the first lens and a total refractive power (P) of the lens system satisfy P1/P>0.6.

3. The small lens system according to claim 1, wherein
   a SAG amount (SAGF) of a front surface of the second lens at an effective diameter height thereof satisfies SAGF<−0.1 mm, and a SAG amount (SAGB) of a rear surface of the second lens at an effective diameter height thereof satisfies SAGB<−0.08 mm.

4. The small lens system according to claim 1, wherein
a refractive power (P3) of the third lens satisfies $-0.05$ mm$^{-1}$<P3<0.05 mm$^{-1}$, a front surface of the third lens is concave toward the object while a SAG amount of the front surface of the third lens is increased toward the object depending on a height thereof, and a rear surface of the third lens is convex toward an image while a SAG amount of the rear surface of the third lens is increased toward the object depending on the height thereof.

5. The small lens system according to claim 1, wherein
a lens thickness (et7) at a total height of a front effective diameter and the center thickness (ct7) of the fourth lens thereof satisfy |et7−ct7|<0.2 mm, and a front surface of the fourth lens is convex toward the object in a vicinity of the optical axis while a rear surface of the fourth lens is concave toward an image in a vicinity of the optical axis.

6. The small lens system according to claim 1, wherein
all surfaces of the first lens, the second lens, the third lens, and the fourth lens are formed as aspherical surfaces, and each of the lenses is made of plastic.

7. The small lens system according to claim 1, wherein a wavelength of light used in the small lens system ranges from 800 nm to 1100 nm.

\* \* \* \* \*